No. 858,087. PATENTED JUNE 25, 1907.
W. B. MASON.
ENGINE BEARING.
APPLICATION FILED DEC. 28, 1903.

2 SHEETS—SHEET 1.

Witnesses:
J. Henry Parker
Alice Tarr

Inventor.
William B. Mason
by Macleod, Calver, Copeland & Dike
Attorneys.

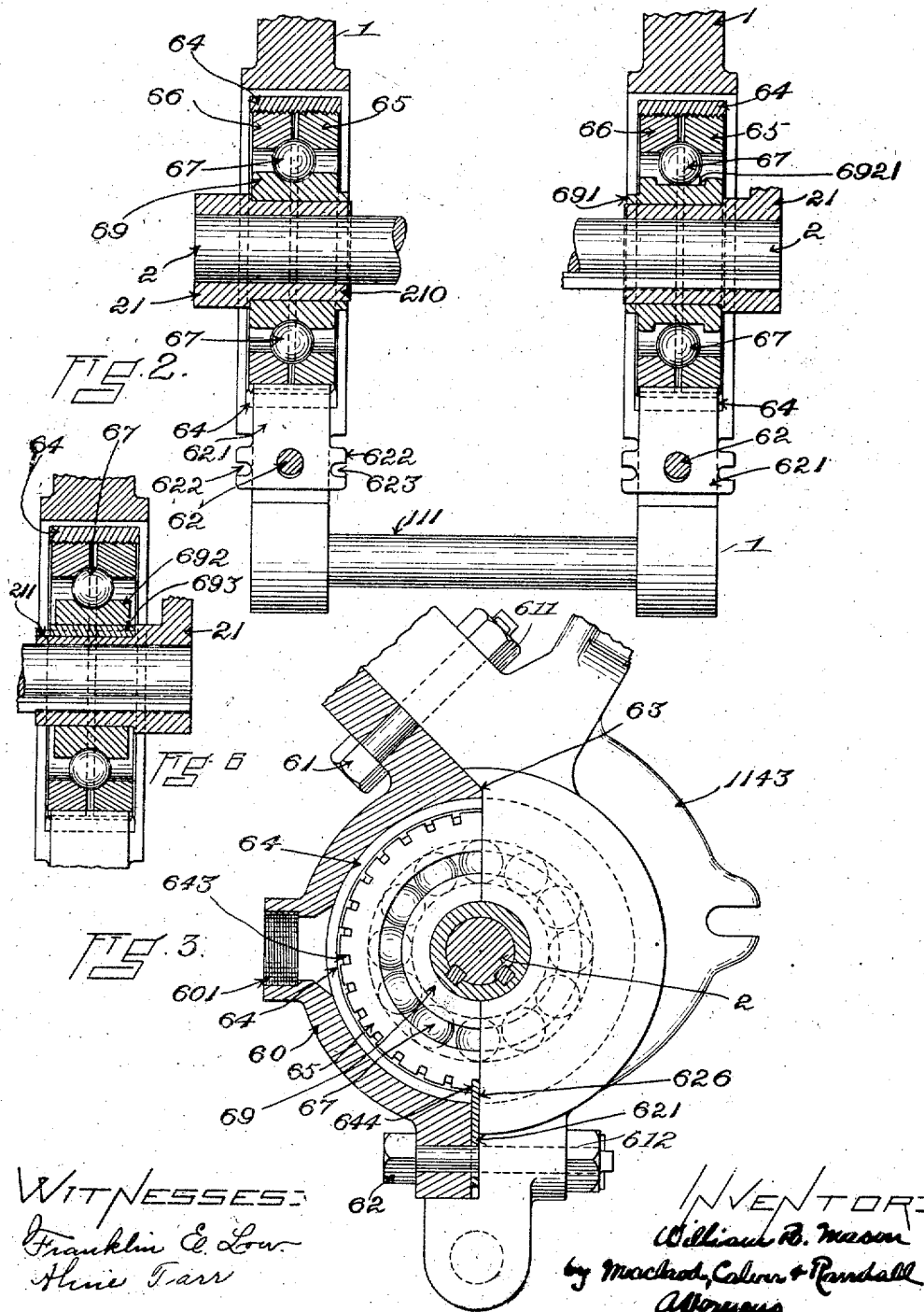

UNITED STATES PATENT OFFICE.

WILLIAM B. MASON, OF BOSTON, MASSACHUSETTS, ASSIGNOR TO THE MASON REGULATOR COMPANY, OF SACO, MAINE, A CORPORATION OF MAINE.

ENGINE-BEARING.

No. 858,087.        Specification of Letters Patent.        Patented June 25, 1907.

Application filed December 28, 1903. Serial No. 186,784.

*To all whom it may concern:*

Be it known that I, WILLIAM B. MASON, a citizen of the United States, residing at Boston, in the county of Suffolk, State of Massachusetts, have invented a certain new and useful Improvement in Engine-Bearings, of which the following is a specification, reference being had therein to the accompanying drawings.

In steam engines for automobiles, or for use in other places, where a small engine of high power is required, considerable difficulty is found in providing bearings for the same which can be adjusted without expert mechanical knowledge, and which when so adjusted will not be affected by jarring. It is necessary that these bearings be simple in arrangement and light and compact in construction. It is also desirable that they be easy to lubricate, and require lubrication infrequently; also that they be dust-proof.

My invention has for its object to provide such bearings and adjustments for the main bearings of an automobile, or other small steam engines. I have also provided the two main bearings with means by which the main bearings are adjustable with relation to each other lengthwise of the shaft without injury to the perfect running of the main shaft. I have shown the same in the accompanying drawings as applied to a steam engine suitable for use in automobiles. This engine is of my own special design and construction, but the form and construction of this engine aside from the bearings herein described form no part of my invention, and I do not wish to be limited to the peculiar construction or form of engine shown herein, as the various forms of bearings and adjustments applied thereto may be applied with equal success and convenience to many other forms of engines.

My invention will be fully understood from the following description, reference being had to the accompanying drawings forming part hereof, and the novel features are pointed out and clearly defined in the claims at the close of this specification.

Figure 1:
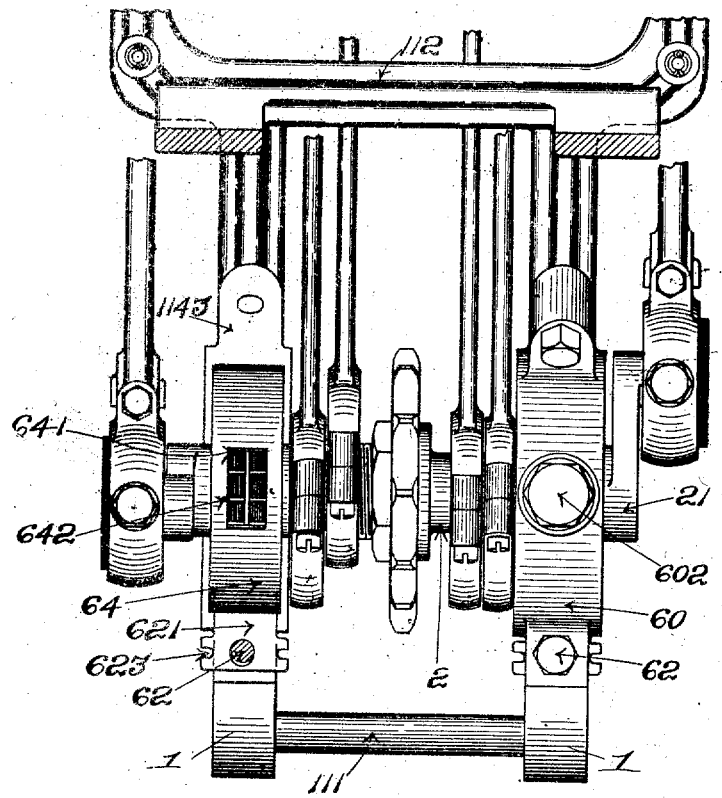
Figure 4:
Figure 5:
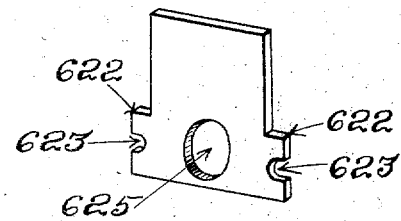

In the drawings,—Figure 1 is a front elevation of the lower part of the engine to which the improvements constituting my invention are applied, showing the main shaft and the respective parts connected therewith. The left hand removable casing or cap constituting a part of the frame is taken off to show the interior construction more clearly. Fig. 2 is a section through the frame and main bearing of the machine. Fig. 3 is a side elevation, certain parts being in section for greater clearness. Fig. 4 is a view of the pry tool I use with my improved bearing. Fig. 5 is a perspective view of the locking plate. Fig. 6 is a detail of the right hand side of the main bearings of the machine and shows a modification of the construction shown in Fig. 2.

Referring to the drawings and more particularly to Figs. 1 and 2, the frame of the engine, which my invention is shown as embodying, consists essentially of two side frames 1 and cross-bars 111 and 112 between the two side frames to hold them rigidly in position and the proper distance apart. In practice, I make the frame of a single casting of bronze, but if preferred it may be made of several members bolted or riveted together. The side frames carry the bearing casing 1143 having therein the main bearing supporting the crank shaft 2 of the engine. These bearings are of peculiar character and construction.

The bearing casing is circular in form and is made of two parts, one of which 1143 is cast integral with the side frame 1; the other part or cap 60 is removable and shown in section in Fig. 3 and in elevation in Fig. 1. This removable cap 60 is attached to the frame and to the grooved portion of the casing 1143 by bolts 61 and 62 which are provided with nuts 611 and 612. Any other convenient or suitable means of attaching the cap may, of course, be used. The line of division of the casing into two halves 1143 and 60 is along the vertical line through the center of the crank shaft 2 to a point 63 and thereafter at an angle therewith, as clearly shown in Fig. 3. Of course, the whole casing may be separated into parts, as is most convenient, but I find this arrangement particularly good, because the retaining means by which the removable cap 60 is held in place is easily accessible.

The casings 1143 and 60 are milled out to receive therein a bearing ring 64. This bearing ring consists of a ring of brass or other suitable material threaded on its interior surface, as shown in Fig. 2, for the reception of the ball cups 65 and 66. These ball cups are made of any suitable material and are provided with threads, in order that they may be screwed into the bearing ring 64. The inner surfaces of the ball cups are grooved for the reception of the balls 67. By rotating the ball cups 65 and 66 in the bearing ring 64, the distance between the ball cups may be adjusted with great nicety; and if the two ball cups are both rotated an equal amount in the same direction, their position in the bearing ring 64 may be adjusted longitudinally of the main shaft 2 with equal precision. Surrounding the main shaft 2 and fast thereto is a ball track 69, having in its outer surface an annular groove corresponding to the contour of the ball.

If both of the bearings in which the main shaft of the engine runs were similar in construction to the one shown at the left hand side of Fig. 2 and had ball tracks fixed to the main shaft and running in close fitting grooves in the ball tracks and the ball cups, the adjustment of the bearings would require great skill of a kind to be acquired only by long practice. Any wrong adjustment of such a bearing results in binding and increased friction, thus defeating the object of ball bearings. To avoid this difficulty, I provide means by which the main shaft is movable lengthwise slightly as regards the balls of one bearing. In Fig. 2 at the right hand side thereof, is shown one way of accomplishing this object. Fast to the main shaft is a ball track 691 provided with a flat bottomed groove somewhat greater in width than the diameter of the ball 67 running therein. The sides as shown in the drawings are substantially vertical, but it is evident that they may be made curved or of any other convenient form, so long as the bottom of the groove is flat. By this device, the ball is permitted to take the necessary position with reference to the track by changing its position in the flat bottom groove of the ball track.

In Fig. 6 I have shown another form of the device embodying my invention. In the sleeve 211 of crank 21 I place a spline 693. The ball track 692 is a loose fit upon the shaft and is made slightly narrower than the interior of the bearing ring 64, and has a groove for the reception of the spline 693, thereby enabling the ball track to slide lengthwise of the shaft. The groove in this ball track corresponds with the balls running therein and the desired freedom from binding is obtained by the movement of the ball track upon the shaft. The left hand bearings as described determine the position of the main shaft and the corresponding parts thereon as regards the movement longitudinally of the shaft, while the right hand bearings allow substantial variations in the distance between the right and left side frames, while at the same time obviating any tendency of the balls to ride upon or against a side of the groove. It is therefore possible to adjust the left hand side properly and thereafter to adjust the right hand side so that the balls of that bearing will bear evenly on both sides of the grooves in the ball cups and ball tracks. Of course it is to be understood that the grooves in the ball tracks may be interchanged and that the one shown at 6921 may be used for the left hand bearing instead of for the right; also that the flat bottomed groove 6921 might be of some other cross section, as far as its sides are concerned, so long as it has the flat bottom referred to, the essential features of this part of my invention being the prevention of longitudinal play on the part of the main shaft supported in two or more ball bearings by the use of a ball track fast to the shaft and the groove of the same cross section as the balls running therein in one of the bearings while the other bearing or bearings are provided with means allowing longitudinal play with relation to the main shaft.

The removable casing 60 (see Fig. 3) is provided with an adjusting opening 601 also suitable for the reception of a grease filler by means of which the interstices of the bearing may be filled with some semi-fluid lubricant. The opening of the casing is closed by a screw plug 602 (see Fig. 1). This adjusting opening 601 is cylindrical and tapped for the reception of the said plug 602, but opens out wider toward the interior as shown in Fig. 3. The bearing ring 64 is provided with a rectangular opening 641 shown clearly in Fig. 1 and corresponding in size and shape to the interior end of the adjusting opening 601, the said rectangular opening of the bearing ring registering with the adjusting opening when the parts are in place. At the right hand side of the rectangular opening 641 in the bearing ring 64 is a locating notch 642 whose use will be hereinafter further described. Upon the outside surface of the ball cup 65 at convenient intervals, preferably quite close together, I form grooves or notches which run all the way across the exterior surface of the said ball cups. The ends of these grooves appear in Fig. 3 and are there numbered 643. These grooves or notches are intended for the reception of a locking plate 621 shown in Figs. 2, 3 and 5. The bearing ring 64 is also provided with a slot at its bottom so located that one of its sides corresponds with the line of division between the two casings 1143 and 60, in order that the locking plate 621 may pass through the bearing ring and into the grooves in the ball cup 65. This slot is seen most clearly in Fig. 3 and is there marked 626, where it is shown with the locking plate 621 passing into it and completely filling it as is the case when the locking plate 621 is in place. The locking plate 621 is held in place by the bolt 62. The upper end of the locking plate penetrates a pair of the grooves or notches in the ball cup 65 and prevents them or the annular bearing ring 64 turning. When the locking plate 621 is being put in place a pair of the grooves 643 one in each ball cup must be opposite each other and at a proper point in order that the locking plate 621 may slide freely into the grooves.

The locking plate 621 is of peculiar form shown most clearly in Fig. 5. The main portion of said locking plate 621 is of a width equal to the thickness of the frame at that point. At the sides of the locking plate and extending outside of the frame are the ears 622 provided with notches 623. An oval hole 625 is provided for the reception of the bolt 62. The locking plate 621 is held in place between the casings 1143 and 60 and passes through the slot 626 into the bottom of the bearing ring 624. The upper edge of the oval hole 625 in the locking plate is at such a distance from the upper edge of the locking plate that when the bolt 62 is inserted in the oval hole 625, the locking plate 621 is held firmly in engagement with the notches 644 of the ball cups 65 and 66.

For use in the adjustment of the bearings, I employ a pry tool shown in Fig. 4 and there designated 70. This pry tool 70 terminates at one end in the slightly curved portion 73 adapted to be inserted through the adjusting opening 621 in the removable casing 60 into the notches 643 in the ball cups 65 and 66, and when so inserted is used to pry the ball cup 65 or 66 one way or the other to produce the desired adjustment of the ball cups. At the other end of the pry tool 70 is a pair of prongs having between them a central projection 71 which is so shaped that it may be inserted in the bolt hole for the lower cap screw 62, and when so inserted will form a fulcrum. The two prongs 72 are formed to engage the notches 623 of the locking plate 621. This tool and the arrangement of the locking plate 621 enable the operator to insert or remove the locking plate with ease under all conditions.

The adjustment of one of the main bearings takes place in the following manner. The lower bolt 62 at the bottom of the casings 1143 and 60 is removed. The central portion 71 of the pry tool 70 is then inserted in the bolt hole from which the bolt 62 has just been removed. When the central portion 71 of the pry tool is inserted in the said bolt hole, the two prongs 72 pass into and engage the notches 623 in the sides of the locking plate 621; thereby enabling the operator to pry the locking plate 621 downward and thus withdraw it from engagement with the notches 644 in the ball cups 65 and 66. In the same manner the pry tool 70 may be used to replace the locking plate 621 when the adjustment has been completed. After the removal of the locking plate 621 from the notch 644, the screw plug 602 is removed, thereby giving access to the adjusting opening 601 in the removable casing 60 and to the rectangular opening 641 in the bearing ring 64. The small end 73 of the pry tool 70 is then inserted in the opening 64 and the notches 643. By prying against the sides of the adjusting opening 601 in the casing 60 the ball cups 65 and 66 may be moved toward or away from each other until the exact adjustment desired is obtained. When this is accomplished, one or the other or possibly both of the rings must be moved slightly one way or the other until a pair of notches 643 are exactly opposite the locating notch 642 (see Fig. 1) in the side of the bearing ring 64. This movement is so slight that it does not affect perceptibly the adjustment of the bearing. When the pair of notches are thus in line with the locating notch 642, it will be found that another pair of notches, one of which appears in Fig. 3 and there numbered 644, exactly 90 degrees from the notches 643, are in position to receive the locking plate 621. The locking plate 621 may now be inserted in the pair of notches 644 by means of the pry tool 70 in a similar manner to that in which it was removed. The lower bolt 62 is then replaced and the upper one 61 tightened, thereby restoring the bearing to its operative condition. When the adjustment of the bearing has been completed, all the cavities and interstices of the main bearing are forcibly filled with ball bearing grease or vaseline to furnish a proper lubrication after which the block 602 is screwed firmly into the adjusting opening 601. When so closed, the bearing is dust proof.

As has been stated before, I make the locking plate 621 of such a length and the hole for the reception of the lower bolt 62 in such a place that the said bolt cannot be inserted until the locking plate is in its proper position with its upper end in the notch 644. Should the locking plate 621 not be in its proper position, the bolt 62 cannot be inserted, as it will strike against the locking plate. By this means it is possible to be perfectly certain that all the parts are in their proper position after the adjustment of the bearing and there can be no danger of the ball cups 65 and 66 working loose and doing damage to the bearing.

From the foregoing description, it will be seen that the bearings embodying my invention may be readily taken apart and put together again when necessary for any purpose; that the parts are easily and delicately adjustable and that there is no possibility of the parts working loose.

I claim as my invention:—

1. The improved ball bearings for a shaft consisting essentially of a plurality of bearings, one of which comprises a ball-track, ball-cups and balls therefor, whereby lengthwise movement of the said shaft is prevented, and another of which comprises ball-cups, and has the balls and tracks therefor movable lengthwise of the shaft, thereby permitting longitudinal adjustment of the bearings with relation to each other upon the shaft, substantially as described.

2. The improved ball bearings for a shaft consisting essentially of a plurality of bearings, one of which comprises a ball-track, ball-cups, and balls therefor, whereby lengthwise movement of the said shaft is prevented, and another of which comprises a ball-track having a flat bottomed groove therein, ball-cups and balls therefor, whereby a slight lengthwise movement of the shaft is allowed, thereby permitting longitudinal adjustment of the bearings with relation to each other upon the shaft, substantially as described.

3. The improved ball bearings for a shaft consisting essentially of a bearing comprising a ball-track fast to said shaft and having therein a groove similar in cross-section to the balls therefor, ball-cups, balls to run in the grooves in the said track and cups, and another bearing consisting of a ball-track similarly fast to the main shaft and having therein a flat bottomed groove, ball-cups having grooves corresponding with the cross-section of the balls, and balls to run in the said track and cups, substantially as and for the purposes described.

4. In a ball bearing the combination of a ball-track, ball-cups threaded upon their peripheral surfaces and having notches or grooves cut transversely across the said peripheral surfaces and adapted for the reception of a tool to move the said ball-cups with relation to each other, and a bearing ring correspondingly threaded on its inside surface for the reception of the said ball-cups and having an opening therein, whereby the notches in the said ball-cups may be reached for adjustment, substantially as described.

5. In a ball bearing, the combination of balls, a ball-track, a pair of ball-cups threaded upon their peripheral surfaces, and having notches or grooves cut transversely across the said peripheral surfaces for the reception of locking means, locking means comprising a plate engaging said notches and a bearing ring threaded on its inside surface for the reception of the said ball-cups, substantially as described.

6. In a ball-bearing the combination of balls, a ball-track, a pair of ball-cups threaded upon their peripheral surfaces and having notches or grooves cut transversely across the said peripheral surfaces for the reception of locking means, and for adjustment, a bearing ring having an opening therein providing access to the said notches for adjustment, and locking means in engagement with an opposite pair of the said notches, whereby the ball-cups are held from turning relatively to each other or to the bearing ring, substantially as described.

7. In a ball bearing the combination of a ball-track, balls therefor, ball-cups threaded upon their peripheral surfaces and having notches or grooves cut transversely across the said peripheral surfaces for the reception of locking means, a bearing ring correspondingly threaded on its inside surface for the reception of the said ball-cups, and having a slot for the admission of locking means into engagement with an opposite pair of notches in the ball-cups, and locking means in engagement with the said notches in the ball-cups whereby the ball-cups are held in position relatively to each other and the bearing ring, substantially as described.

8. The improved ball bearings comprising, essentially, an exterior casing in two parts, ball-cups screwed into the said casing, and having notches at intervals in their threaded peripheral surface for the reception of locking means, locking means therefor projecting through a slot in the said casing into engagement with the notches in the said ball-cups, and holding means whereby the said locking means is held in engagement with the aforesaid notches, substantially as described.

9. The improved locking device for notched ball-cups of ball bearings comprising, essentially, a metal piece having a portion for engagement with the notches of the ball-cups, another portion for engagement with a pry tool in the insertion or removal of the said device, and having a hole therein for the reception of holding means, as a bolt, substantially as described.

10. The improved locking device for notched ball-cups of ball bearings comprising, essentially, a metal piece having a portion for engagement with the notches of the ball-cups, having projections for engagement with a pry tool in the insertion or removal of the said device, and having an oval hole therein for the reception of holding means, as a bolt, substantially as described.

11. The improved locking device for notched ball-cups of ball bearings comprising, essentially, a metal piece having a portion for engagement with the said notches, and having a portion thereof for engagement with a pry tool in the removal or insertion of the said piece, said locking piece having a hole therein for the reception of a holding means so located that the bolt can be inserted only when the locking piece is in engagement with the aforesaid notches of the ball-cups, substantially as described.

In testimony whereof I affix my signature in presence of two witnesses.

WILLIAM B. MASON.

Witnesses:
Wm. A. Macleod,
Alice H. Morrison.